Aug. 16, 1932.  J. W. BRINDLEY  1,872,632

VALVE, COCK, AND THE LIKE
Filed July 7, 1930

Witness:  Inventor:
Arthur Thompson  James William Brindley

Patented Aug. 16, 1932

1,872,632

UNITED STATES PATENT OFFICE

JAMES WILLIAM BRINDLEY, OF JOHANNESBURG, TRANSVAAL PROVINCE, UNION OF SOUTH AFRICA

VALVE, COCK, AND THE LIKE

Application filed July 7, 1930, Serial No. 466,024, and in Union of South Africa August 19, 1929.

This invention relates to valves, cocks and the like, suitable for use with air, steam, gases, water, including acid or corrosive water, or other aeriform gaseous, or liquid fluids.

The object of the invention is to construct a valve, cock or the like of simple, efficient, cheap and durable construction, and one in which the part or parts which is or are subject to the greatest amount of wear, and consequently call for renewal from time to time, can, if desired, be removed and easily and cheaply renewed or replaced in effecting repairs to the valve.

A valve, cock or the like according to the invention can be constructed largely of ordinary standard pipe fittings or substantially similar shaped parts.

According to the invention the body or main part of the valve, cock or the like is in the form of a T-piece, having a hollow member or bush arranged therein and tightly fitting the same, the said member or bush being constructed to provide the fluid port or passage through the valve, cock or the like, and being constructed to provide a seating with which the controlling element or valve proper co-operates.

The bush terminates at a point some distance from the inlet end of the outlet passage through the body, and the outlet from the bush into the body is made at right angles to the inlet and outlet passages, and provides the valve seating. In this construction the inlet branch of the body may be made somewhat longer than the outlet branch to accommodate the one end of the bush.

A tubular extension may be provided to serve as a housing for the spindle operating the valve proper, and a combined guide and gland be arranged in the housing for the spindle. In the construction shown in Figs. 3 and 4 a spring is provided between the guide and valve proper for holding the valve on its seating. The tubular housing may be fashioned at the top with inclined surfaces to be engaged by the means provided for rotating the spindle to raise and open the valve against the action of the spring. The inclined surfaces may be of such a shape that the movement of the operating handle or lever through a quarter of a revolution will fully open or close the valve.

The invention will be described in detail with the aid of the accompanying drawing, wherein two practical embodiments of the same are illustrated. In the drawing, Fig. 1 is a part-sectional elevation of a screw-down or angle valve, incorporating the invention.

Figures 1, 2:
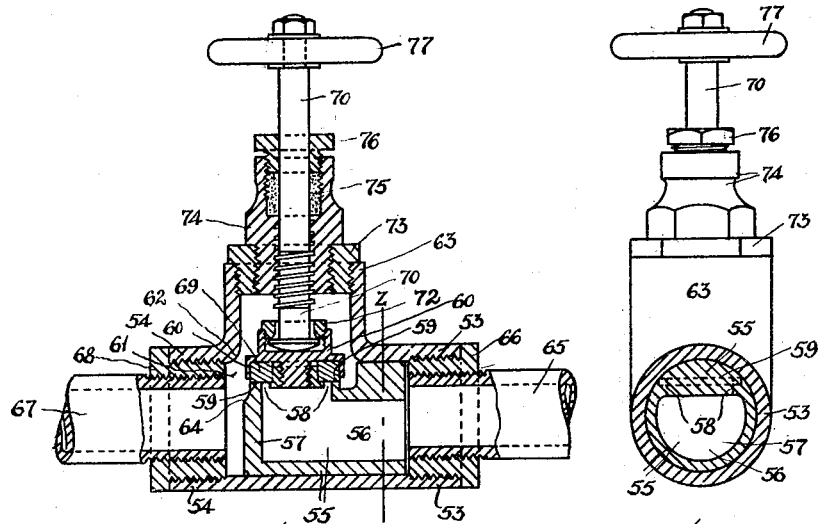
Fig. 2 is a part-sectional end elevation of Fig. 1 on line $z$—$z$.

In the embodiment of the invention represented in Figs. 1 and 2, the valve body is in the form of a T-piece, having the one and inlet branch 53 somewhat longer than the other and outlet branch 54, so as to ensure adequate contact between the interior of the branch 53 and the metal bush 55, when the latter is forced into position. The end of the bush 55 in the inlet branch 53 is open to provide the port or passage 56, and the other end thereof is closed, as indicated at 57. The bush 55 is constructed with an outlet 58, which is at right angles to the port or passage 56, and around said outlet 58 is formed an annular seating 59 for the valve 60. The bush 55 is so positioned in the body that a passage 61 is provided between it and the body, which passage 61 communicates with the outlet. As shown at 62, the interior of the T-piece, at the junction between the branch 54 and the branch 63 which constitutes the housing for the valve proper, is rounded to a suitable radius to increase the width of the passage 61. For the same purpose the end of the bush 55 may be shaped as indicated at 64.

65 is the inlet pipe connected with the inlet branch 53 by reducing nipple 66, and 67 the outlet pipe which is connected wtih the outlet branch 54 by the reducing nipple 68.

The valve 60 is shaped to receive an annular packing ring 69 which co-operates with the seating 59. The means for operating the valve 60 is such as to allow the valve to adapt itself to the seating 59 to ensure proper contact between the faces of the seating 59 and the packing ring 69. For this purpose the inner end of the valve spindle 70 is constructed with a rounded extremity 71 which is seated in a recess in the valve 60 and held in position therein by a cap 72.

The branch 63 has screwed into it a reducing socket 73 into which is screwed a part or member 74 through which the valve spindle 70 is screwed. The part 74 provides the stuffing box 75 around the valve spindle 70; 76 being the gland nut screwed thereinto. 77 is the hand-wheel on the end of the spindle 70 for operating the valve.

Figures 3, 4:
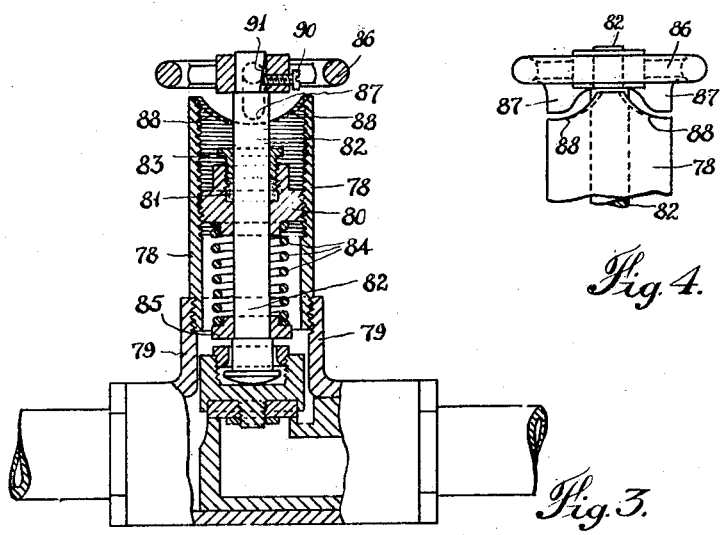
Fig. 3 is a part-sectional elevation of an angle valve embodying other alternative details of construction.
Fig. 4 is a detail end elevation, taken at right angles to Fig. 3, of the means for operating the valve.

In Figs. 3 and 4, the body, the bush and the valve are of similar construction to Figs. 1 and 2. In this construction the means for operating the valve includes a tubular piece 78 screwed into the branch 79, and provided with an internal screw-thread to receive a part 80 which forms a stuffing box 81 around the valve spindle 82; 83 being the gland nut. 84 is a coiled spring which is arranged around the spindle 82 and bears at one end against the part 80, and at the other end against a collar 85 on the spindle 82. The spring 84 operates to close the valve. On the upper end of the spindle 82 is fixed the hand-wheel 86 which is provided with two diametrically opposed curved projections 87. The outer end of the tubular piece 78 is fashioned with or cut away to form two opposing recesses between two flat surfaces, which recesses form inclined surfaces 88 with which the curbed projections 87 engage and ride up when the hand-wheel 86 is rotated in one direction to open the valve, in which position the projections 87 rest on the flat surfaces; the projections 87 moving off the flat surfaces into the recesses when the hand-wheel 86 is moved in the opposite direction to allow the spring 84 to close the valve.

The hand-wheel 86 is shown fixed on the squared upper end of the spindle 82 by means of a screw 90 screwed through the boss of the hand-wheel 86 into a tapered recess 91 formed in one side of the squared end portion. Instead of operating the spindle 82 by means of a hand-wheel, it is evident that it may be operated by means of a handle or lever.

What I claim as my invention and desire to protect by Letters Patent is:—

1. A valve or cock including a one-piece T-shaped body, a hollow member arranged within the T-piece and having a portion which tightly fits one branch of the body and providing a main passage with a right-handed outlet leading into the body and an annular seating for the valve proper around said outlet, said member being arranged to provide a passage between its inner end and the other and opposite branch of the body, a valve proper, having a spindle, which co-operates with said seating, a tubular extension which forms a housing for the valve spindle, a combined guide and gland for the spindle arranged in said extension, and spring means arranged in the housing between the guide and valve proper for forcing the latter on to its seating, as set forth.

2. A valve or cock including a one-piece T-shaped body, a hollow member arranged within the T-piece and having a portion which tightly fits one branch of the body and providing a main passage with a right-angled outlet leading into the body and an annular seating for the valve proper around said outlet, said member being arranged to provide a passage between its inner end and the other and opposite branch of the body, a valve proper, having a spindle and means for rotating it, which valve co-operates with said seating, a tubular extension which forms a housing for the valve spindle, a combined guide and gland for the valve spindle arranged in said extension, and spring means arranged in the housing between the guide and valve proper for forcing the latter on to its seating, the housing being constructed at the top to form inclined surfaces which are engaged by he spindle rotating means to raise and open the valve, as set forth.

3. A valve or cock including a one-piece T-shaped body, a hollow member arranged within the T-piece and having a portion which tightly fits one branch of the body and providing a main passage with a right-angled outlet leading into the body and an annular seating for the valve proper around said outlet, said member being arranged to provide a passage between its inner end and the other and opposite branch of the body, a valve proper which co-operates with said seating, and a reducing nipple screwed into the branch at the inlet end of the hollow member for making connection between the body and the inlet pipe, as set forth.

In testimony whereof, I have signed my name to this specification.

JAMES WILLIAM BRINDLEY.